US00RE36309E

United States Patent [19]

Kanai et al.

[11] E Patent Number: Re. 36,309

[45] Reissued Date of Patent: Sep. 21, 1999

[54] HANDOFF METHOD FOR CELLULAR DIGITAL MOBILE COMMUNICATION SYSTEM AND MOBILE STATION

[75] Inventors: Toshihito Kanai; Yukitsuna Furuya, both of Tokyo, Japan

[73] Assignee: NEC Corporation, Tokyo, Japan

[21] Appl. No.: 08/326,396

[22] Filed: Oct. 20, 1994

Related U.S. Patent Documents

Reissue of:

[64] Patent No.: 5,157,661
Issued: Oct. 20, 1992
Appl. No.: 07/276,833
Filed: Nov. 28, 1988

[30] Foreign Application Priority Data

| | | | |
|---|---|---|---|
| Nov. 27, 1987 | [JP] | Japan | 62-301127 |
| Jan. 11, 1988 | [JP] | Japan | 63-4159 |
| Jan. 14, 1988 | [JP] | Japan | 63-7174 |
| Mar. 18, 1988 | [JP] | Japan | 63-66480 |

[51] Int. Cl.[6] ..... H04Q 7/22; H04Q 7/32; H04B 7/212

[52] U.S. Cl. ..... 370/331; 370/332; 455/437; 455/442

[58] Field of Search ..... 370/95.1, 95.3, 370/241, 330, 331, 332.13; 455/33.1, 33.2, 33.4, 436, 437, 438, 439, 442, 443; 379/60, 63

[56] References Cited

U.S. PATENT DOCUMENTS

| | | | |
|---|---|---|---|
| 4,215,244 | 7/1980 | Gutleber | 370/347 |
| 4,414,661 | 11/1983 | Karlstrom | 370/332 |
| 4,475,010 | 10/1984 | Huensch et al. | 370/334 |
| 4,608,711 | 8/1986 | Goldman | 455/436 |
| 4,638,479 | 1/1987 | Alexis | 370/344 |
| 4,682,367 | 7/1987 | Childress et al. | 455/17 |
| 4,726,050 | 2/1988 | Menich et al. | 455/425 |
| 4,754,450 | 6/1988 | Lynk, Jr. et al. | 370/280 |
| 4,765,753 | 8/1988 | Schmidt | 455/437 |
| 4,797,947 | 1/1989 | Labedz | 455/422 |
| 4,872,204 | 10/1989 | Hammer et al. | 455/515 |

FOREIGN PATENT DOCUMENTS

| | | |
|---|---|---|
| 0145098 | 6/1985 | European Pat. Off. . |
| 0288904 | 11/1988 | European Pat. Off. . |
| 2566562 | 12/1985 | France . |
| 53-131703 | 11/1978 | Japan . |
| 58-9442 | 1/1983 | Japan . |
| 58-187033 | 11/1983 | Japan . |
| 58-191542 | 11/1983 | Japan . |
| 59-161138 | 9/1984 | Japan . |
| 59-178027 | 10/1984 | Japan . |
| 59-212041 | 11/1984 | Japan . |
| 8705458 | 9/1987 | WIPO . |

OTHER PUBLICATIONS

Recommendation GSM 05.02 Version 0.4.1, "Multiplexing and multiple access of information streams on the mobile radio path," Sep. 30, 1987.

Z.C. Fluhr and P.T. Porter, "Control Architecture," The Bell System Technical Journal, vol. 58, No. 1, Jan. 1979.

(List continued on next page.)

*Primary Examiner*—Min Jung
*Attorney, Agent, or Firm*—Sughrue, Mion, Zinn, Macpeak & Seas, PLLC

[57] ABSTRACT

According to a handoff method for a cellular digital mobile communication system, a communication test of a new channel is performed by utilizing a free time of a time-divisionally multiplexed channel. A mobile station of this invention includes a communication circuit for performing communication by using a time-divisionally multiplexed channel, a switching circuit for connecting a new channel during a free time of the time-divisionally multiplexed channel, and a communication test circuit for performing a communication test when the switching circuit is connected to the new channel.

13 Claims, 14 Drawing Sheets

OTHER PUBLICATIONS

C.J. Eughes, "United Kingdom Total Access Communications System Mobile Station—Land Station Compatibility Specification," British Telecom Research Laboratories, Oct. 1984.

Recommendation GSM 05.08 Draft 0.4 (excerpt) "Layer 1 aspects of handover and RF power control", Jun. 17, 1987 (authors unknown).

Recommendation GSM 05.08 Version 00.05.01 (excerpt) "Layer 1 aspects of call managements", Sep. 4, 1987 (authors unknown).

Recommendation GSM 05.06 Version of 00.05.03 (excerpt) "Radio Subsystem Aspects of MS Protocols in Idle Mode", Nov. 12, 1987 (authors unknown).

Second Nordic Seminar on Digital Land Mobile Radio Communication, Proceedings (excerpt) Oct. 14–16, 1986 (authors unknown).

Recommendation GSM 03.09—Handover Procedures, Draft 2.0.0 (excerpt), May, 1987 (authors unknown).

"United Kingdom Total Access Communication System Mobile Station–Land Station Compatibility Specification", Issue 3, Oct. 1984.

The Bell System Technical Journal. vol. 58, No. 1, "Control Architecture", Z.C. Fluhr and P.T. Porter pp. 43–69, Jan. 1979.

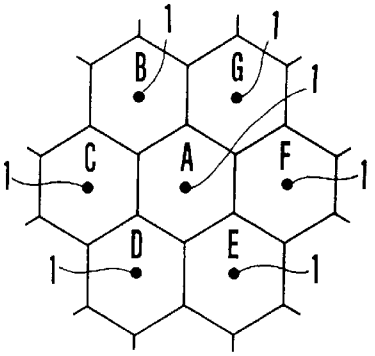
FIG.1
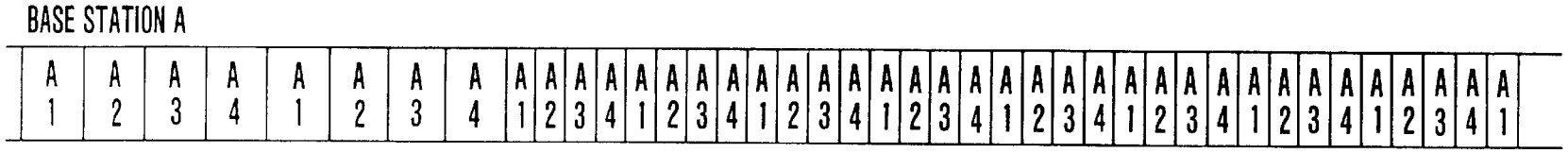
FIG.2(A)
FIG.2(B)
FIG.2(C)

TIME →

| | | | | | | | | | | | | |
|---|---|---|---|---|---|---|---|---|---|---|---|---|
| CARRIER FREQUENCY $f_{11}$ | T1 | T2 | T3 | T4 | T5 | T6 | T7 | T8 | T9 | T10 | T11 | T12 |
| CARRIER FREQUENCY $f_{12}$ | S1 | S2 | S3 | S4 | S5 | S6 | S7 | S8 | S9 | S10 | S11 | S12 |
| CARRIER FREQUENCY $f_{13}$ | R1 | R2 | R3 | R4 | R5 | R6 | R7 | R8 | R9 | R10 | R11 | R12 |
| CARRIER FREQUENCY $f_{21}$ | T1 | T2 | T3 | T4 | T5 | T6 | T7 | T8 | T9 | T10 | T11 | T12 |
| ⋮ | | | | | | | | | | | | |
| CARRIER FREQUENCY $f_{n3}$ | R1 | R2 | R3 | R4 | R5 | R6 | R7 | R8 | R9 | R10 | R11 | R12 |

HANDOFF METHOD FOR CELLULAR DIGITAL MOBILE COMMUNICATION SYSTEM AND MOBILE STATION

Matter enclosed in heavy brackets [ ] appears in the original patent but forms no part of this reissue specification; matter printed in italics indicates the additions made by reissue.

BACKGROUND OF THE INVENTION

The present invention relates to a handoff (busy channel switching) method for a cellular digital mobile communication system constituted by small radio zones (cellular system).

A service area of the cellular system is divided into a large number of radio zones (cell sites), and identical frequencies are utilized again in remote cell sites to increase the number of mobile telephone sets per frequency. The number of potential users of mobile telephones is larger than the actual number of users covered by the existing systems. Therefore, strong demand has arisen for a large-capacity system. The size of the cell site may be reduced to increase the system capacity within the limited frequency band. For example, if the radius of the cell site is reduced to 1/10, frequency utilization efficiency can be increased to 100 times.

When the size of the cell site is minimized, however, the frequency of communication channel switching, i.e., a handoff is increased since a mobile station is moved from one site to another during communication. A handoff sequence of an existing system is described in Bell System Technical Journal Vol. 58, No. 1, January 1979, P. 65. Upon designation of a new cell site channel, a mobile station interrupts communication via the present channel, and the channel is then switched to a new channel. In this state, the mobile station performs a communication test and restarts communication on the new channel. According to this method, communication is interrupted for 0.7 to 0.8 sec during the communication test.

Since the communication is interrupted for 0.7 to 0.8 sec according to the conventional handoff method, communication quality is greatly degraded when the channels are frequently switched upon an increase in the number of cell sites.

In addition, in the conventional handoff method, detection of movement of a mobile station between cell sites is concentrated on a base station and a radio channel control station. When the size of the cell site is minimized, the handoff operation must be frequently performed, and a control amount is locally increased, thereby requiring a large-capacity apparatus.

SUMMARY OF THE INVENTION

It is an object of the present invention to provide a handoff method substantially free from an interruption time and a mobile station for realizing the method.

It is another object of the present invention to provide a handoff method in which a control amount is not locally concentrated, and a mobile station for realizing this method.

In the handoff method of a cellular digital mobile communication system according to the present invention, a free time of a time-divisionally multiplexed channel is utilized to perform a communication test of a new channel.

The mobile station of the present invention comprises communicating means for performing communication using a time-divisionally multiplexed channel, switching means for connecting a new channel during the free time of the channel, and a communication test circuit for performing a communication test of the new channel when the switching means switches the channel to the new channel.

BRIEF DESCRIPTION OF THE DRAWINGS

FIG. 1 is a view showing allocation of cell sites of a cellular digital mobile communication system which employs the present invention;

FIGS. 2A, 2B and 2C are views showing frame formats of channels of each cell site according to an embodiment of a handoff method of the present invention;

DETAILED DESCRIPTION OF THE PREFERRED EMBODIMENTS

Figure 3:
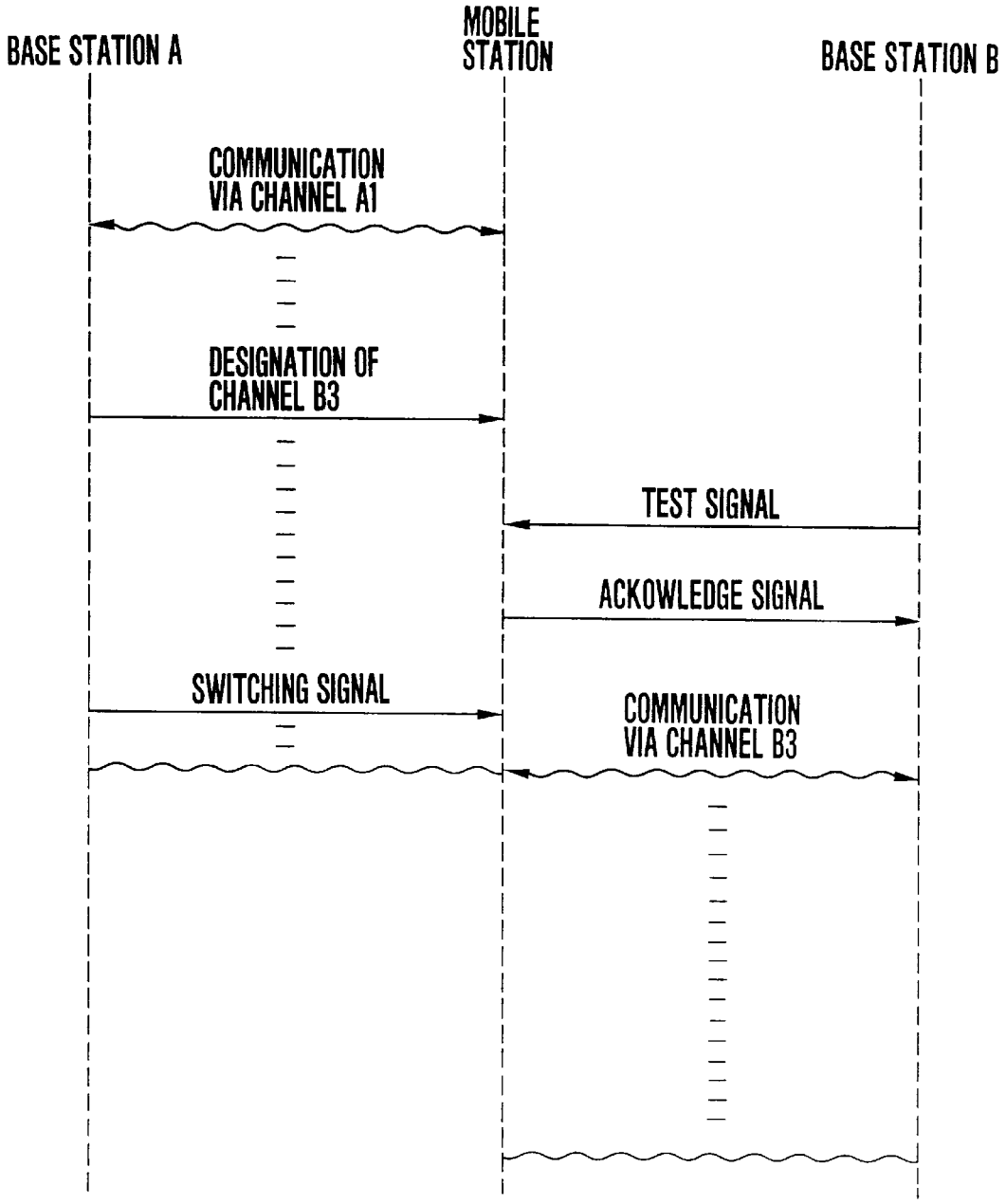
FIG. 3 is a view showing a handoff sequence using the frame formats shown in FIGS. 2A to 2C.

Preferred embodiments of the present invention will be described with reference to the accompanying drawings.

FIG. 1 shows allocation of base stations of a cellular digital mobile communication system which employs a handoff method, i.e., a method of switching communication channels (to be referred to as channels hereinafter). Referring to FIG. 1, a coverage area of the system constitutes a grid consisting of radio zones, i.e., cell sites of a large number of base stations 1. FIG. 2A shows a format assigned to a base station A, FIG. 2B shows a format assigned to base stations B, D, and F, and FIG. 2C shows a format assigned to base stations C, E and G.

In the channel format of the base station 1, a frame having a length of 8 T (to be referred to as an 8 T frame hereinafter) constituted by time slots each having a length of 2 T is repeated twice, and a frame having a length of 4 T (to be referred to as a 4 T frame hereinafter) of time slots each having a length of T are repeated eight times. When the frame format is assigned to the base station 1 as described above, while the 8 T frame is repeated twice, the adjacent base stations repeat the 4 T frame. Therefore, all channel switching operations of the base stations can be completed within the 6 T free time which is available during repetition of the 8 T frame twice.

Assume that a new channel B3 is designated for a mobile station which is moving by using a channel A1 at present. In this case, the mobile station switches the present channel to the channel B3, performs a communication test with the base station B, and then returns to the channel A1 when the first half of the continuous 2 T time slots of the channel A1 is completed. When the communication test is not completed within the time slot, the communication test can be performed using a plurality of time slots. With this arrangement, the mobile station can continuously perform communication via the channel A1 and at the same time the communication test of the newly designated channel B3. The communication test for other channels than the channel B3 can be performed in the same manner as described above.

FIG. 3 is a view showing control procedures of a first handoff sequence using the frame formats shown in FIGS. 2A to 2C. When a mobile station connected to the base station A via the channel A1 enters into a cell site of base station B, this entrance is detected by an exchange. The exchange then selects a free channel B3 of the base station B as a new channel. This detection technique is well known to those skilled in the art. The exchange designates the channel number B3 of the base station B to the mobile station via the base station A by using a signal in the channel A1. The exchange renders the base station B to transmit a test signal via the channel B3. The mobile station receives the channel B3 designated by utilizing the free time of the channel. The mobile station detects the test signal and sends back an acknowledge signal via the channel B3. The exchange which receives the acknowledge signal via the base station B designates switching to the mobile station by using the signal in the channel A1. Upon designation of switching, the mobile station switches the channel from A1 to B3. In this manner, when the communication test is performed by utilizing the free time of the channel, the interruption time of communication can be shortened.

Figure 4:
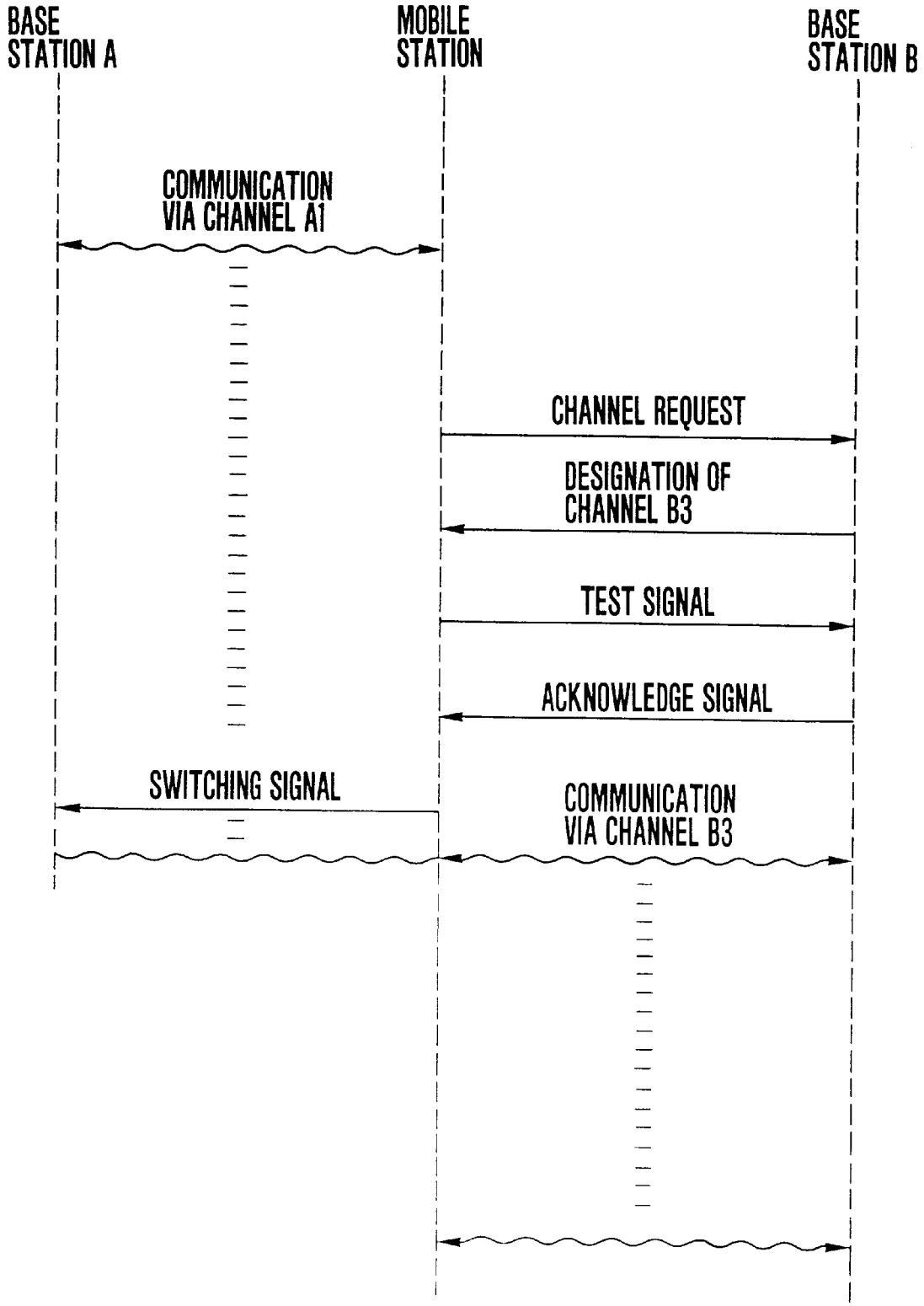
FIG. 4 is a view showing another handoff sequence using the frame formats shown in FIGS. 2A to 2C.

FIG. 4 is a view showing control procedures of a second handoff sequence using the channel frame formats shown in FIGS. 2A to 2C. When a mobile station connected to the base station A via the channel A1 enters into a cell site of the base station B, this mobile station detects entrance into the cell site of the base station B. This detection can be performed such that a control channel commonly and time-divisionally utilized by a plurality of base stations is monitored by using the channel free time and mean values of reception levels of the control channel transmitted from the respective base stations are compared. The mobile station which detects crossing between the cell sites requests a channel to the base station B. In response to this, the base station B designates the channel number B3 to the mobile station. The request and the designation of the channel described above are performed by utilizing the channel free time, and therefore communication is not interfered. The mobile station then transmits a test signal by utilizing the free time of the channel A1 via the newly designated channel B3. When the base station B detects this test signal, it sends back an acknowledge signal via the channel B3. When the mobile station receives the acknowledge signal from the base station B, the mobile station designates switching to the exchange via the base station A by using a signal in the channel A1. The mobile station then switches the channel from A1 to B3. The exchange which receives a signal for designating switching switches a communication line from the base station A to the base station B.

Figure 5:
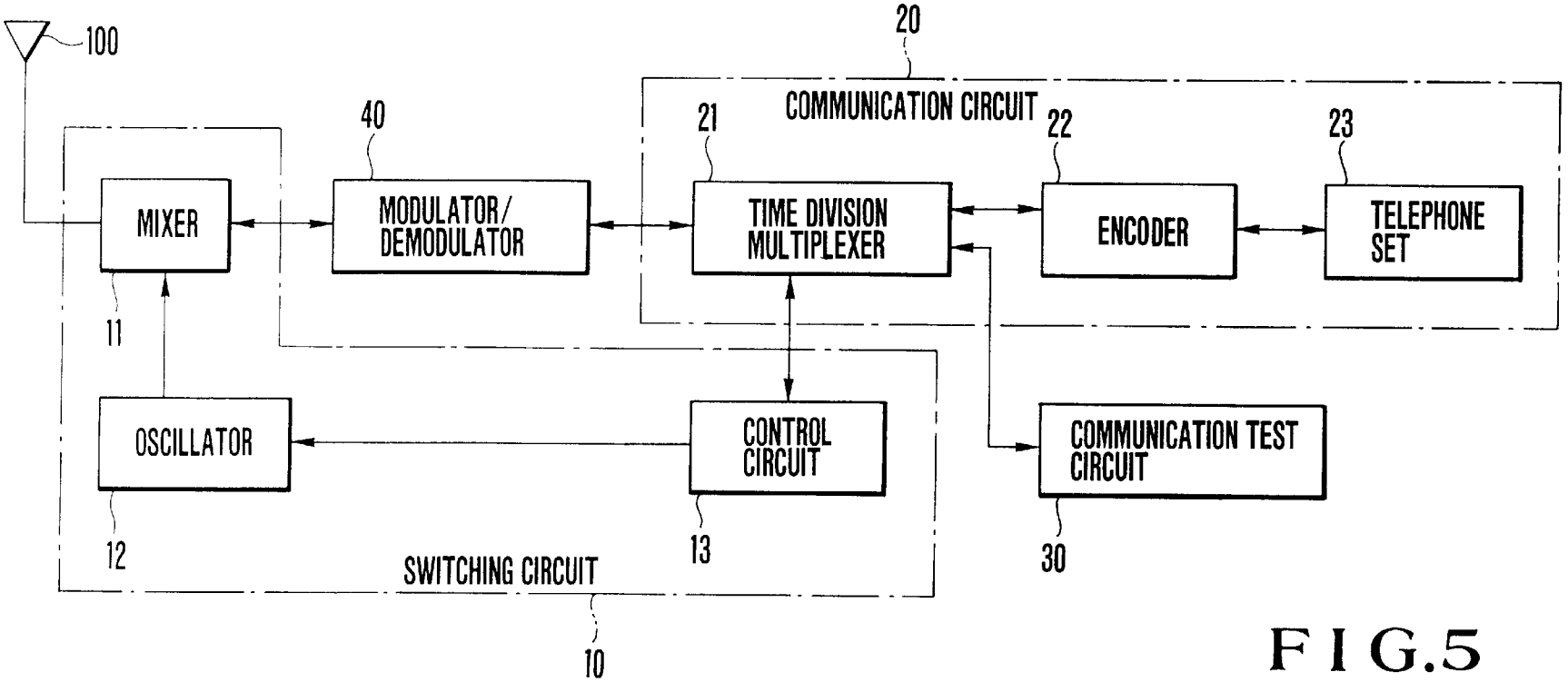
FIG. 5 is a block diagram of a mobile station for realizing the handoff sequences of FIGS. 3 and 4.

FIG. 5 is a block diagram showing a mobile station for realizing the handoff sequences of FIGS. 3 and 4. Reference numeral 10 denotes a switching circuit; 20, a communication circuit; and 30, a communication test circuit. An RF signal received by an antenna 100 is converted into an IF signal by a mixer 11 and demodulated by a modulator/demodulator 40. The demodulated signal is input to a time division multiplexer 21. The time division multiplexer 21 extracts a channel signal of present communication from outputs from the modulator/demodulator 40, and the extracted signal is sent to an encoder 22. The encoder 22 extracts a control signal which is then supplied to a control circuit 13. The encoder 22 converts an output from the time division multiplexer 21 into a speech signal and sends it to a telephone set 23.

A speech signal as an output from the telephone set 23 is converted into a digital signal by the encoder 22, and the digital signal is input to the time division multiplexer 21. A control signal as an output from the control circuit 13 constituted by a microprocessor is input to the time division multiplexer 21. These signals are converted into a time division multiplexed signal by the time division multiplexer 21. The multiplexed signal is modulated by the modulator/demodulator 40. The modulated signal is converted into an RF signal by the mixer 11. The RF signal is transmitted from the antenna 100. Time-division multiplexing and modulation/demodulation techniques are not limited to any specific ones.

Upon detection of the signal for designating the new channel number, when the present channel time slot is completed, the control circuit 13 changes a frequency of an oscillator 12 to tune the mixer 11 to a frequency of the new channel thereby to cause the communication test circuit 30 to connect with the new channel through the time division multiplexer 21. When the communication test circuit 30 detects a test signal via the new channel, it sends back an acknowledge signal. Alternatively, the communication test circuit 30 transmits a test signal via the new channel and receives an acknowledge signal. When the time slots of the new channel are completed, the control circuit 13 changes the frequency of the oscillator 12 to tune to the frequency of the present channel and connects the communication circuit 20 to the present channel via the time division multiplexer 21 again. With the above operation, the communication test can be performed without adversely affecting communication. Therefore, the interruption time of communication during the handoff sequence can be shortened.

Since a conventional mobile telephone system employs analog modulation, an SCPC (Single Channel Per Carrier) method is generally employed in which one channel is assigned to one carrier frequency. In the SCPC method, since the mobile station is always kept in the transmission or reception state during communication, two receiver/transmitters are required to perform a communication test while communication is kept continued.

However, when digital modulation is performed, N channels can be assigned to one carrier frequency by time division multiplexing. In this case, a time required for setting each mobile station in the transmission and reception states can be 1/N of the total communication time. The mobile station is kept in the standby state during the remaining time. According to the present invention, this free time is utilized to perform a communication test of a new channel by one receiver/transmitter without interfering the present communication.

In general, in time division multiplexing, the time slots of the channel have equal intervals. When a new channel which overlaps the present channel along the time axis is designated, the time slots of the present channel always overlap those of the new channel. Therefore, a communication test cannot be performed even if a free time is utilized. According to the present invention, the time slots of the channels have unequal intervals. Even if any channel is newly assigned, a free time is available which does not involve overlapping between the time slots of the present and new channels. With this time slot assignment, a communication test can be performed without adversely affecting communication, and the interruption time can be almost eliminated.

FIGS. 6A, 6B, 7A, and 7B show channel frame formats according to another embodiment of a handoff method of the present invention.

Figure 6A:
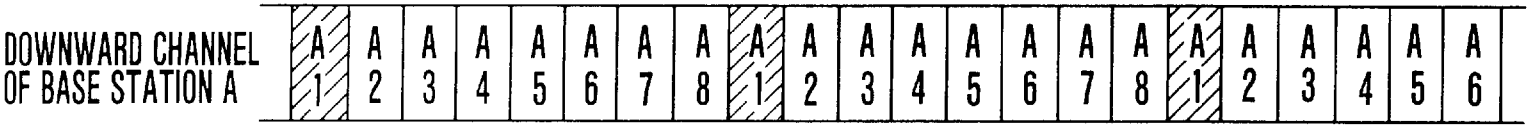
FIGS. 6A, 6B, 7A, and 7B are views showing frame formats of channels according to another embodiment of the handoff method of the present invention.
Figure 6B:
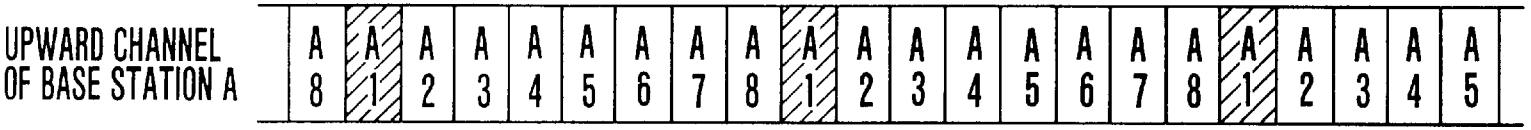
Figure 7A:
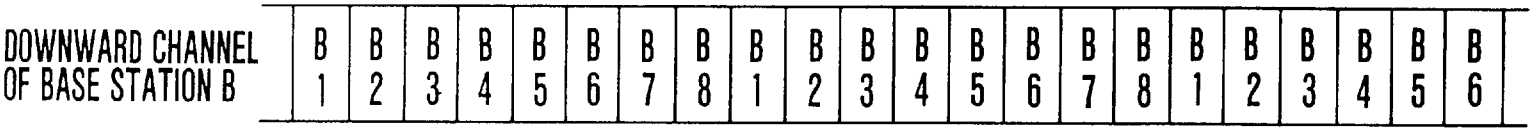
Figure 7B:
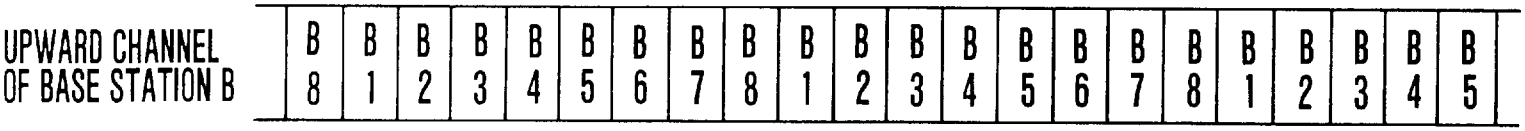

FIGS. 6A and 6B show frame formats of a downward channel from a base station A to a mobile station and an upward channel from the mobile station to the base station A. FIGS. 7A and 7B show frame formats of a downward channel from a base station B to a mobile station and an upward channel from the mobile station to the base station B.

The downward and upward channels of each base station have a predetermined frequency difference. An 8 T frame constituted by eight time slots each having a length of T are repeated to constitute each channel.

In addition, a time difference between the downward and upward channels is one time slot. Therefore, after the mobile station receives information in a time slot of the downward channel, it transmits information in a time slot of the upward channel.

Assume that a mobile station connected to the base station A via a channel A1 performs a communication test with the base station B during communication. After the mobile station receives information via the upward channel A1, it changes a frequency to that of the base station B and waits for a test signal via a new downward channel. When the mobile station detects a test signal via a new downward channel, it sends back an acknowledge signal via the new upward channel, immediately changes the channel to the channel of the base station A, and starts communication.

Frequency switching generally requires a given period of time. Accordingly, when the mobile station transmits the signal via the upward channel A1 and then changes the frequency, the signal cannot be received via the downward channel B3 but by the channel B4. If newly assigned channels are B4, B5, and B6, the mobile station detects a test signal via a downward channel and sends back an acknowledge signal via an upward channel. The mobile station then switches the frequency to that of the base station A. In this case, information in the next time slot of the channel A1 can be received, and therefore no interruption caused by the communication test occurs.

If newly assigned channels are B7, B8, B1, B2, and B3, the mobile station detects a test signal via a downward channel and sends back an acknowledge signal via an upward channel. The mobile station then switches the frequency to that of the channel of the base station A. In this case, the mobile station cannot receive information in the next time slot of the channel A1. Therefore, one time slot of the channel A1 is lost and interruption occurs. However, such interruption has almost no effect on the communication quality and is negligible.

In the above frame formats, a new downward channel can be detected within one frame upon frequency switching. However, even if a new downward channel is not detected upon a lapse of one frame, the present channel is forcibly restored, and a loss of the time slots can be reduced to one, thereby preventing degradation of communication quality.

In addition, if a loss of a plurality of time slots assures allowable communication quality, a new downward channel can be observed for a plurality of frames.

Two handoff sequences according to the channel frame formats shown in FIGS. 6A to 7B will be described with reference to flow charts of FIGS. 8 and 9, respectively.

Figure 8:
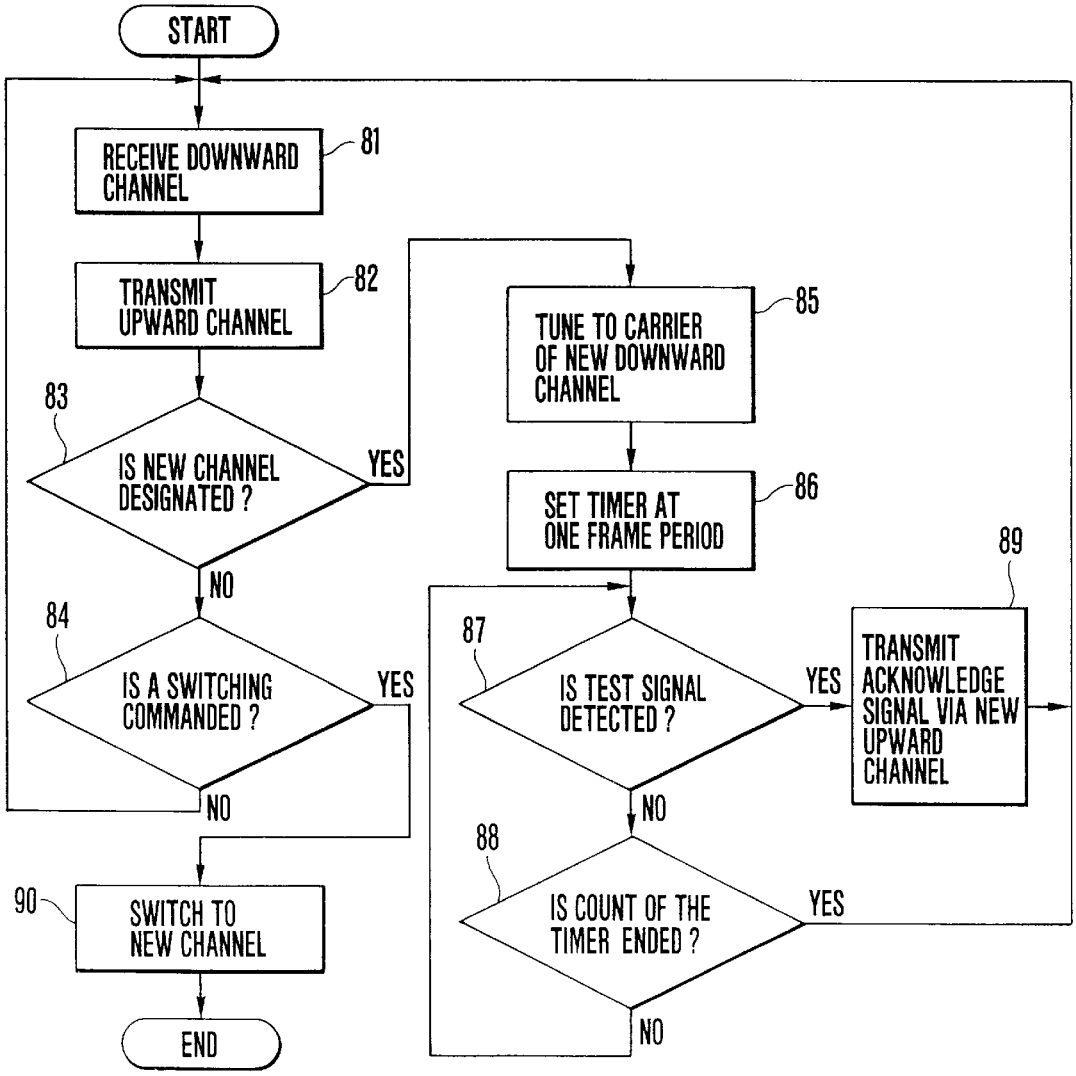
FIG. 8 is a flow chart showing a handoff sequence using the channel frame formats shown in FIGS. 6A to 7B.

In the handoff sequence of FIG. 8, a mobile station is connected to the base station A and repeats downward channel reception (step 81) via the channel A1 and transmission via the upward channel (step 82) of the channel A1 of the frame formats of FIGS. 6A, 6B, 7A, and 7B. When this mobile station enters into a cell site of the base station B, the exchange detects this entrance and selects a free channel, e.g., B3 of the base station B as a new channel. The exchange designates the new channel to the mobile station by using a signal in the channel A1 via the base station A.

The exchange causes the base station B to transmit a test signal via the channel B3. In step 83, upon designation of the new channel, the mobile station tunes to the carrier of the downward channel B3 at the end of the time slots of the channel A1 in step 85. In step 86, a timer is set at one frame period. The mobile station then waits for a test signal via the downward channel B3. When the mobile station detects the test signal in step 87, the mobile station transmits an acknowledge signal via the new upward channel B3 in step 89. The mobile station returns to the channel A1 and continues communication.

If the test signal is not detected upon a lapse of a one-frame period in step 88, the flow returns to step 81. In this case, no operation is performed, and the mobile station continues communication via the channel A1. When the exchange receives the acknowledge signal via the base station B, the exchange designates switching (handoff) to the mobile station by using the signal in the channel A1. The exchange itself switches the channel from A1 to B3. In response to the designation of the handoff (step 84), the mobile station switches the channel from A1 to B3 (step 90). In this manner, when the communication test is performed while communication continues, an interruption time during the handoff sequence can be shortened.

Figure 9:
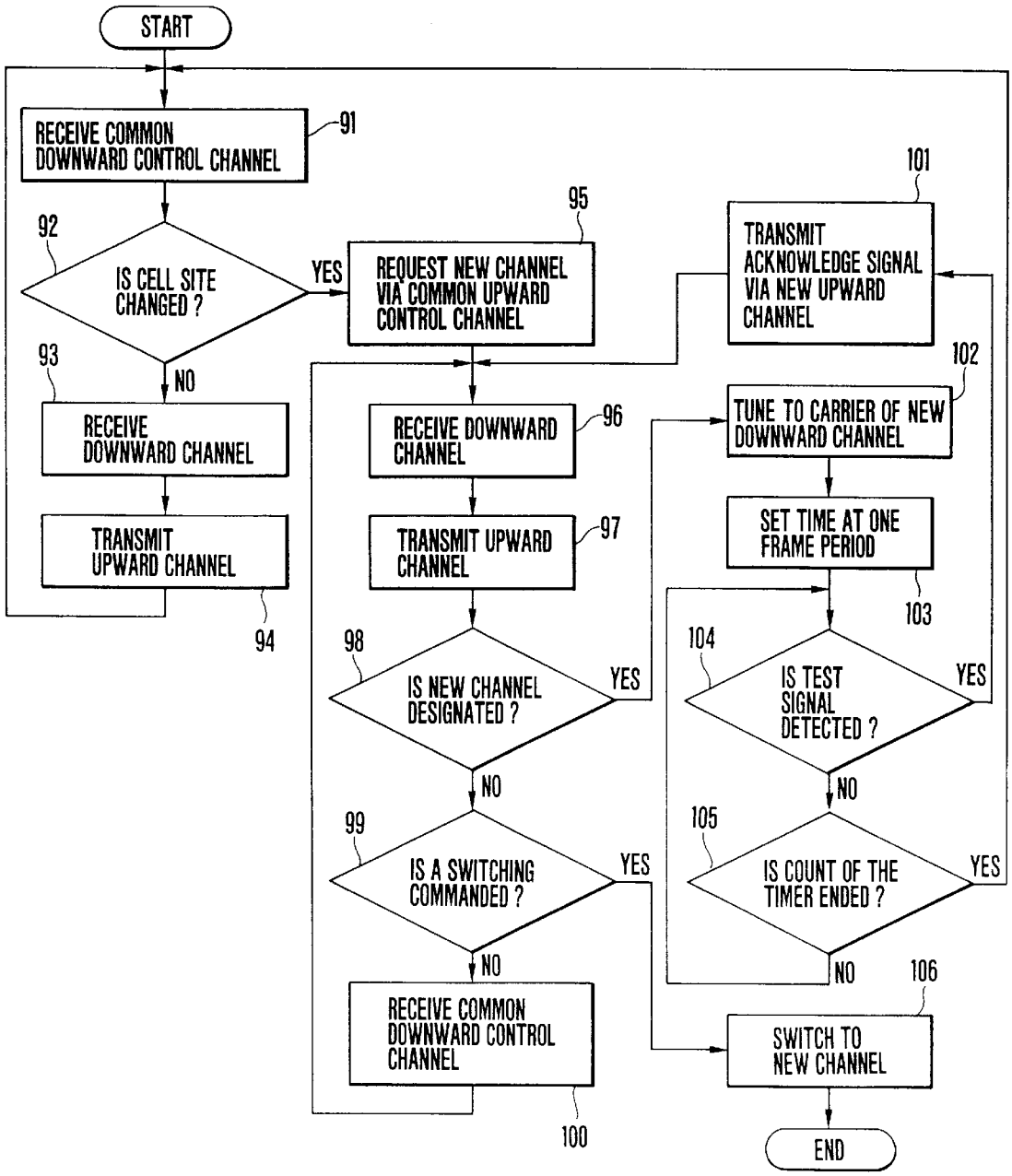
FIG. 9 is a flow chart showing another handoff sequence using the channel frame formats shown in FIGS. 6A to 7B.

In the handoff sequence shown in FIG. 9, the mobile station communicates with the base station via a channel and at the same time receives a common downward control channel time-divisionally utilized by a plurality of base stations by using a channel free time (step 91). The mean values of the reception levels of the downward control channel of the base stations are compared to detect whether the mobile station enters into another cell site (step 92). For example, when a mobile station connected to the base station A via the channel A1 enters into a cell site of the base station B, the mobile station which has detected the entrance in the cell site in step 95 transmits a signal for requesting a new channel to the base station B via the control channel. In response to this, the base station B designates the channel number B3 to the mobile station via the downward control channel and transmits a test signal via the channel B3. Exchange of signals between the mobile station and the base station B in steps 96 and 97 is performed by utilizing a free time of the channel. The mobile station which is designated with the new channel B3 in step 98 tunes the frequency to the carrier of the channel B3 (step 102) upon completion of the time slots of the channel A1. The timer is set at one frame period (step 103). The mobile station then waits for a test signal via the channel B3. When the mobile station detects the test signal in step 104, the mobile station transmits an acknowledge signal via the channel B3 in step 101. The flow returns to step 96. The mobile station then continues communication via the channel A1.

However, if the test signal is not detected upon a lapse of a one-frame period in step 105, the flow returns to step 91. No operation is performed, and the mobile station continues communication via the channel A1. When the base station B receives the acknowledge signal, the base station B transmits a switching signal to the exchange and the mobile station. The exchange and the mobile station which receive the switching signal in step 99 switch the channel from A1 to B3 in step 106.

Figure 10:
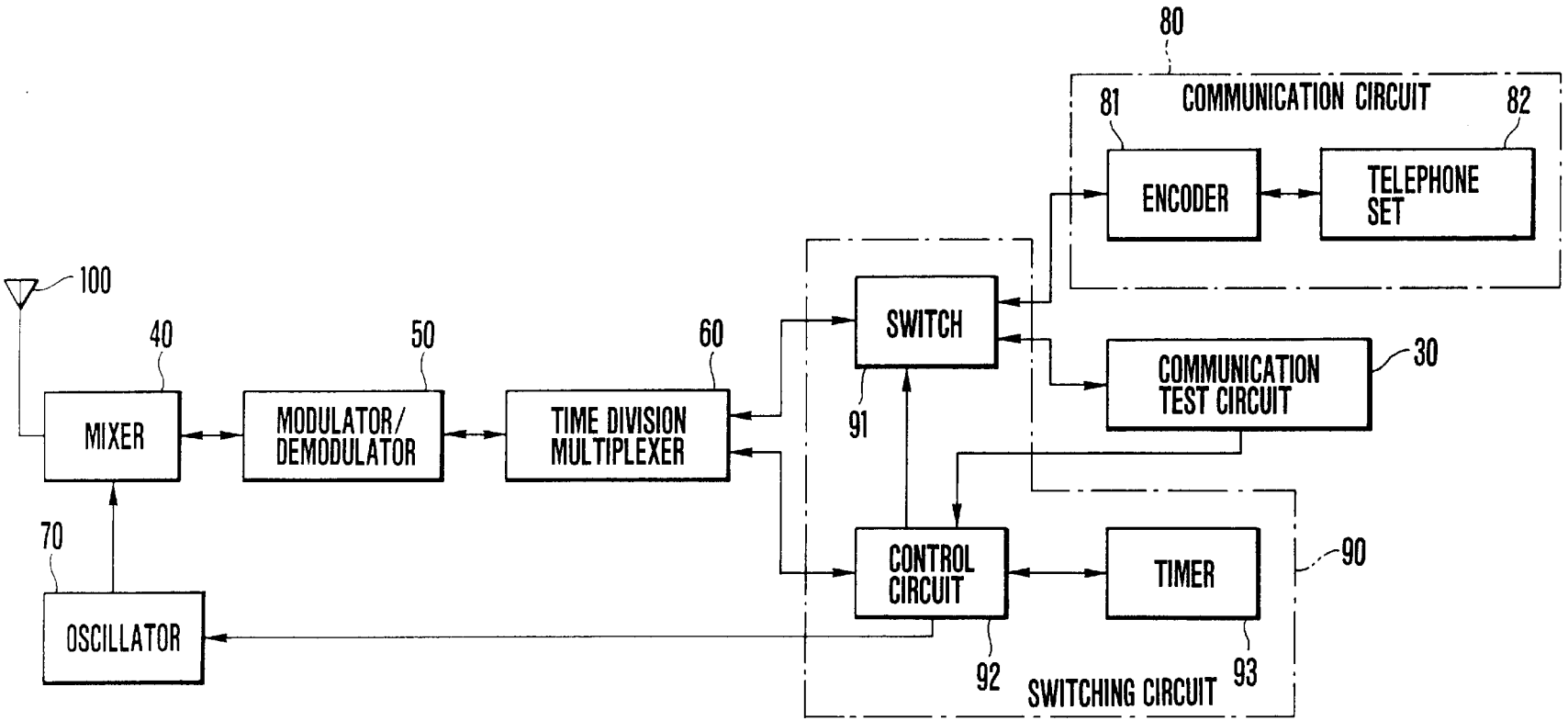
FIG. 10 is a block diagram showing a mobile station for realizing the handoff sequences of FIGS. 8 and 9.

FIG. 10 is a block diagram of a mobile station for realizing the handoff sequence shown in FIG. 9. Reference numeral 80 denotes a communication circuit; 30, a communication test circuit; and 90, a switching circuit.

An RF signal received by an antenna 100 is converted into an IF signal by a mixer 40. The IF signal is demodulated by a modulator/demodulator 50. The demodulated signal is input to a time division multiplexer 60. The time division multiplexer 60 extracts a speech signal from the output from the modulator/demodulator 50. The speech signal is sent to a switch 91. The time division multiplexer 60 extracts a control signal from the output from the modulator/demodulator 50 and sends it to a control circuit 92. The switch 91 is controlled by the control circuit 92 to connect the time division multiplexer 60 to an encoder 81 or the communication test circuit 30. The time division multiplexer 60 is normally connected to the encoder 81, and the encoder 81 converts an output from the time division multiplexer 60 into a speech signal. The speech signal is sent to a telephone set 82.

A speech signal as an output from the telephone set 82 is converted into a digital signal by the encoder 81. This digital signal is input to the time division multiplexer 60. A control signal as an output from the control circuit 92 is input to the time division multiplexer 60. These input signals are multiplexed by the time division multiplexer 60, and the multiplexed signal is the modulator/demodulator 50. The modulated signal is converted into an RF signal by the mixer 40. The RF signal is then transmitted from the antenna 100. Time-division multiplexing and modulation/demodulation techniques are not limited to any specific ones, and a detailed description will be omitted.

Upon detection of the signal for designating a new channel number, when the time slots of the present channel are completed, the control circuit 92 changes a frequency of an oscillator 70 and tunes to the frequency of the new channel. The switch 91 connects the time division multiplexer 60 to the communication test circuit 30, and a timer 93 is set at one frame period. When a one-frame period has elapsed, the timer 93 outputs a detection signal to the control circuit 92.

When the communication test circuit 30 detects a test signal via the new channel, it sends back or transmits an acknowledge signal to signal the end of communication test to the control circuit 92. When the communication test is completed, or a one-frame period has elapsed, the control circuit 92 changes the frequency of the oscillator 70 and tunes it to the frequency of the present channel. The time division multiplexer 60 is connected again to the encoder 81, and communication continues. With the above operations, the communication test can be performed without adversely affecting communication. Therefore, a communication interruption time during the handoff sequence can be shortened.

According to the above embodiment as has been described above, the communication test of the new communication channel can be performed while communication continues. Therefore, a new channel can be switched during communication without degrading communication quality.

Figure 11:
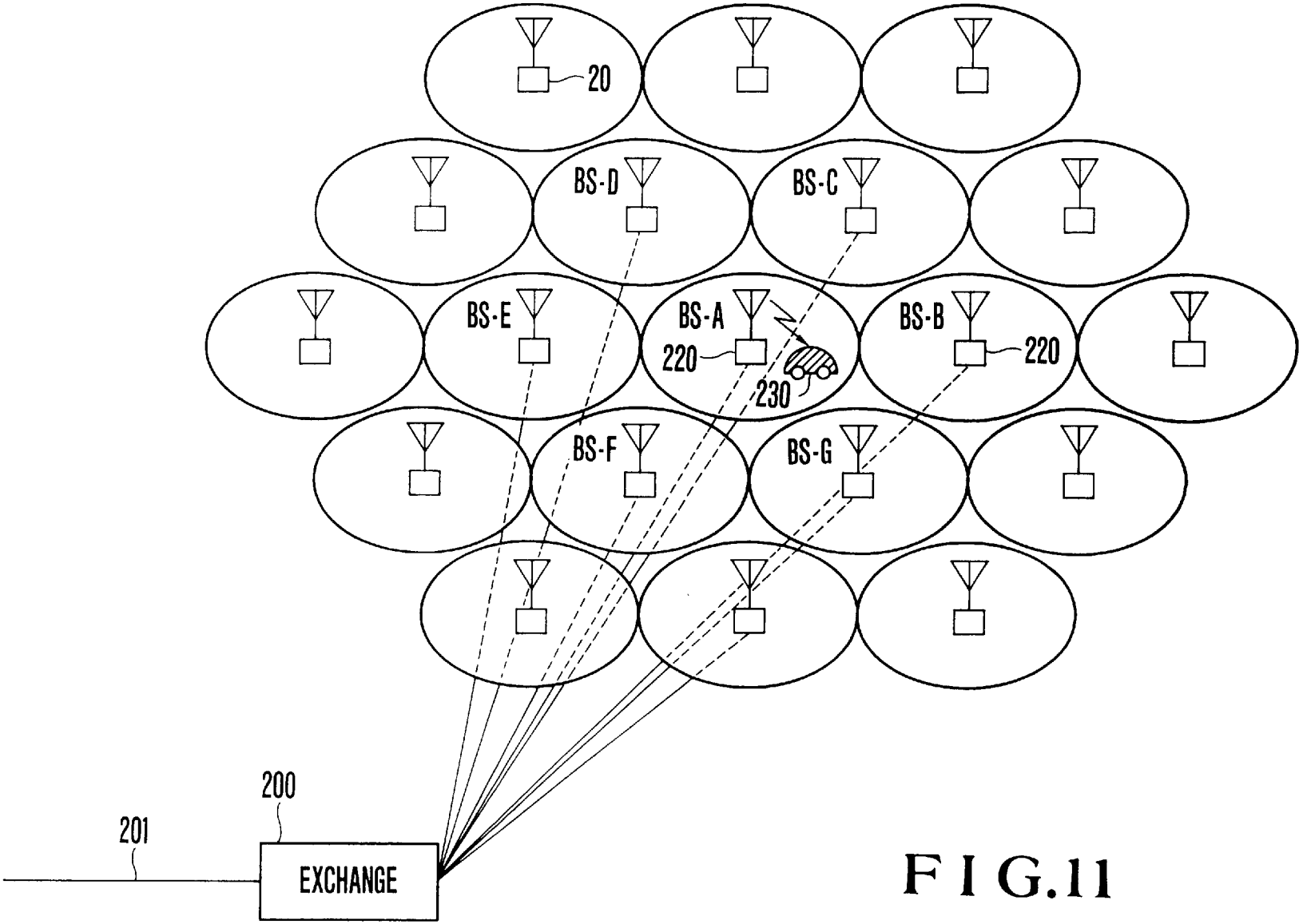
FIG. 11 is a view showing a system employing still another embodiment of a handoff method of the present invention.

FIG. 11 is a view showing a cellular digital mobile communication system employing a handoff method according to still another embodiment of the present invention.

Referring to FIG. 11, the cellular digital mobile communication system is constituted by an exchange 200, base stations 220, and a mobile station 230. The base station 220 includes at least one TDMA radio transmitter/receiver, and the mobile station 230 includes one TDMA radio transmitter/receiver.

The mobile station 230 located within the cell site of a given base station 220 (to be referred to as a BS-A hereinafter) sets a communication channel with the BS-A and is wired via the exchange 200. When the mobile station 230 is moved from the cell site of the BS-A to a cell site of an adjacent base station (e.g., BS-B), the mobile station 230 must detect that a new channel can be set with the BS-B. The mobile station 230 switches the channel with the BS-A into that with the BS-B and continues communication.

Figure 12:
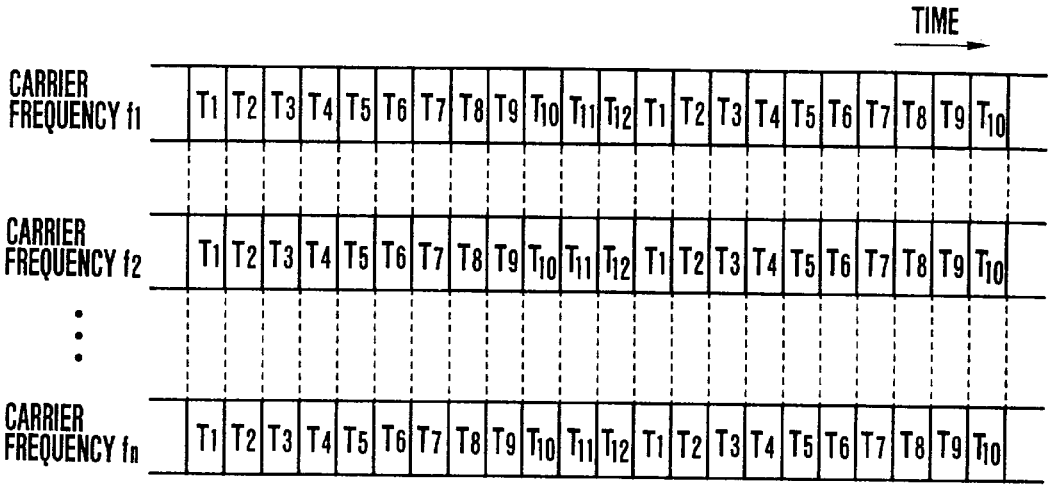
FIG. 12 is a view showing a time division operation of the carrier frequency in the handoff method practiced by the system shown in FIG. 11.
Figure 13:
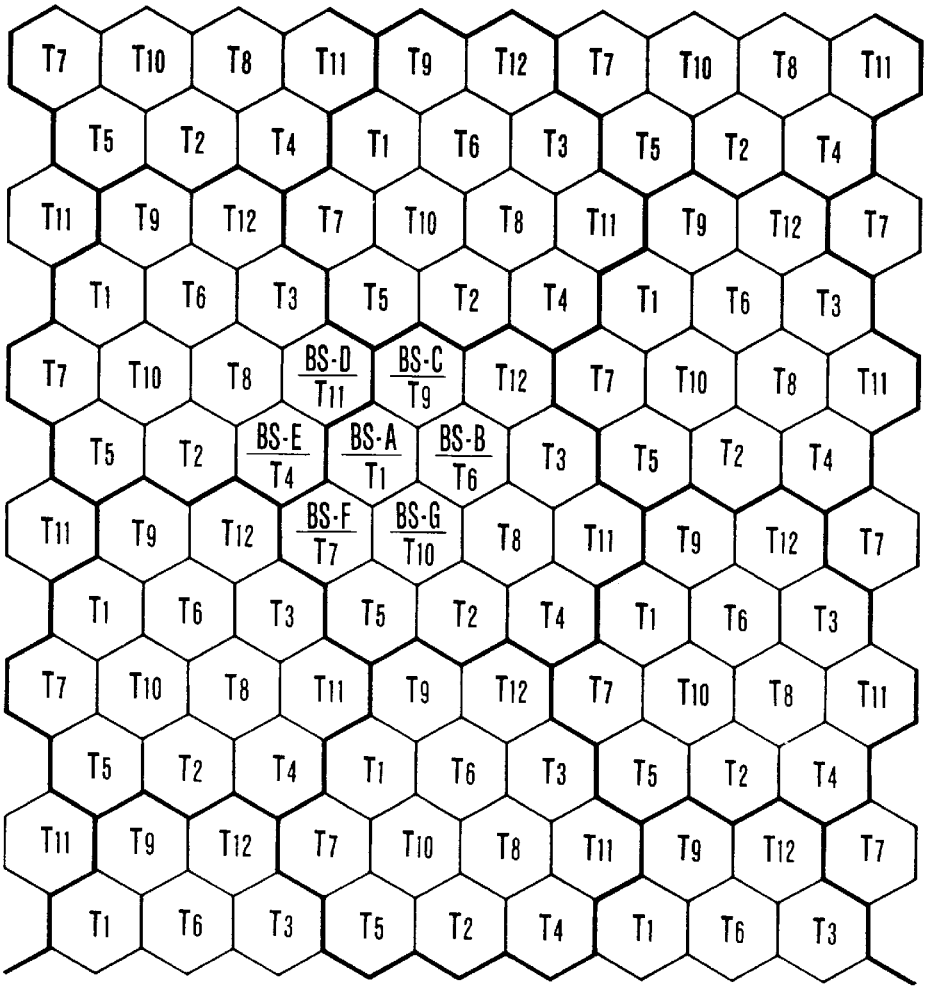
FIG. 13 is a view showing assignment of time-divisional carrier frequencies shown in FIG. 12 to cell sites.

FIGS. 12 and 13 show first example of time division of carrier frequencies and spatial allocation of the time-divisionally carrier frequencies, respectively.

Referring to FIGS. 12 and 13, the carrier frequencies to be used are given as $f_1, f_2, f_3, \ldots f_n$, and twelve channels are time-divisionally multiplexed so as to synchronize with the carrier frequencies $f_1, f_2, f_3, \ldots f_n$. Channel groups $T_1$ to $T_{12}$ are constituted by channels at identical timings. The channel groups $T_1$ to $T_{12}$ are assigned to the base stations such that the channel groups are not used in the adjacent base stations. In this case, the number of cell sites in a group having an identical frequency is 12.

Since the channel group $T_1$ is assigned to the BS-A, the mobile station 230 located in the cell site of the BS-A performs transmission or reception at the timing $T_1$ of each of the carrier frequencies $f_1$ to $f_n$. With the this arrangement, when the mobile station 230 which uses the channel of the channel group $T_1$ is moved to the cell site of an adjacent base station (one of BS-B to BS-G), the channel groups which may be newly assigned to this mobile station 230 are $T_4$, $T_6$, $T_7$, $T_9$, $T_{10}$, and $T_{11}$. Since these channel groups have differences of one or more time slots from the channel group $T_1$ which has been used, respectively, a channel group newly assigned to the free time can be designated while communication continues via the channel group $T_1$, and therefore a communication can be performed via the new channel group.

Figure 14:
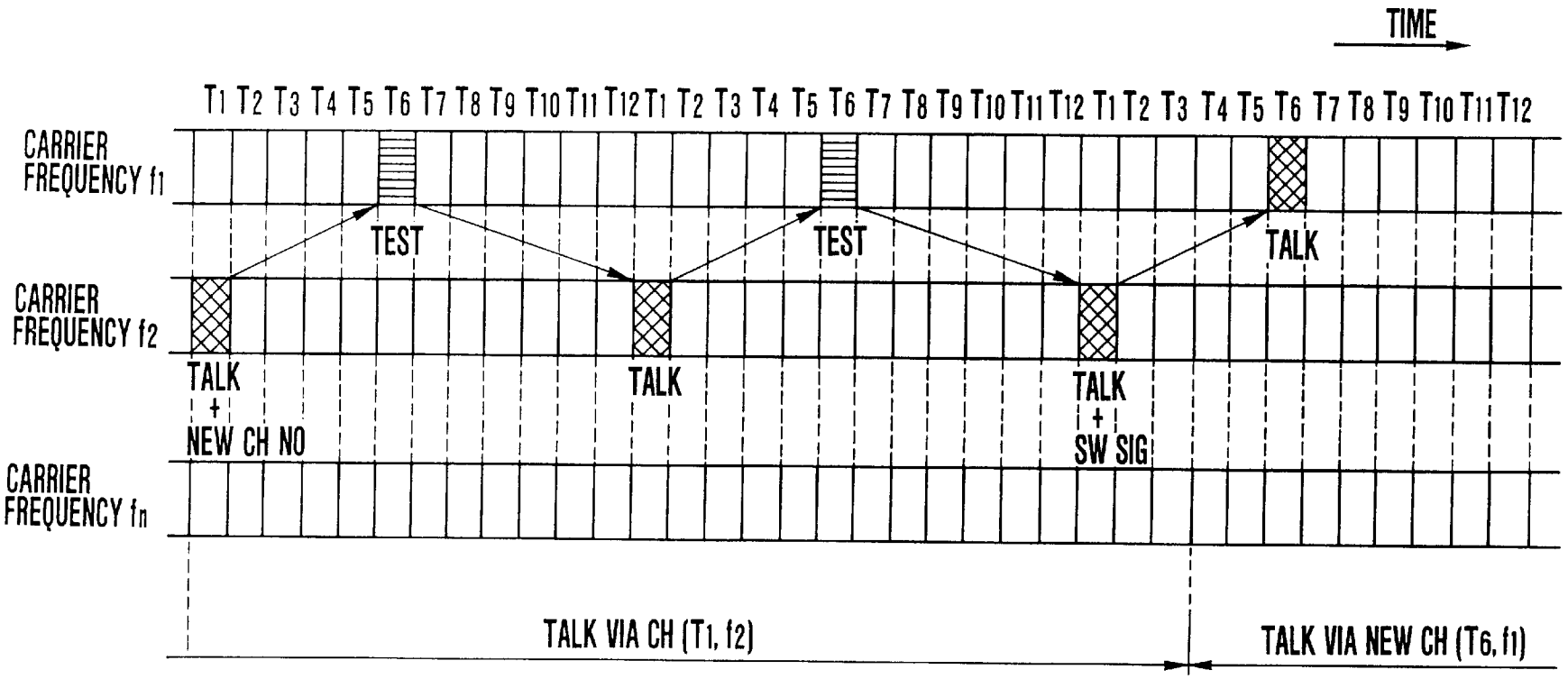
FIG. 14 is a view showing a handoff sequence executed according to assignment of the carrier frequencies shown in FIGS. 12 and 13.

FIG. 14 is a view showing a handoff sequence executed according to carrier frequency allocation shown in FIGS. 12 and 13.

With reference to FIG. 14, assume that a mobile station using a channel of the frequency $f_2$ of the channel groups $T_1$ (to be referred to as a channel $(T_1,f_2)$ hereinafter) of the BS-A is moved to a cell site of the BS-B. When this mobile station is moved in the cell site of the BS-B, the exchange detects this movement and selects a free channel, e.g., $(T_6,f_1)$ as a new channel of the cell site of the BS-B, and designates this to the mobile station by using a signal in the channel $(T_1,f_2)$. This detection by the exchange is well known to those skilled in the art, and a detailed description thereof will be omitted. The exchange transmits a test signal to the BS-B via the channel $(T_6,f_1)$. The mobile station designated with the new channel $(T_6,f_1)$ waits for a test signal transmitted via the channel $(T_6,f_1)$ upon completion of the time slots of the channel $(T_1,f_2)$. When the mobile station detects the test signal, it transmits or sends back an acknowledge signal via the channel $(T_6,f_1)$, returns to the channel $(T_1,f_2)$, and continues communication. A communication test is performed through two frames in FIG. 14. However, a communication test may be completed within one frame or continued for three or more frames. When the exchange receives the acknowledge signal via the channel $(T_6,f_1)$ of the BS-B, the exchange designates switching to the mobile station by using a signal in the channel $(T_1,f_2)$. The exchange itself switches the communication line from the BS-A to the BS-B. Upon designation of a handoff sequence, the mobile station switches the channel from $(T_1,f_2)$ to $(T_6,f_1)$. In this manner, when the communication test is performed while communication continues, an interruption time during the handoff sequence can be shortened.

Figures 15, 16:
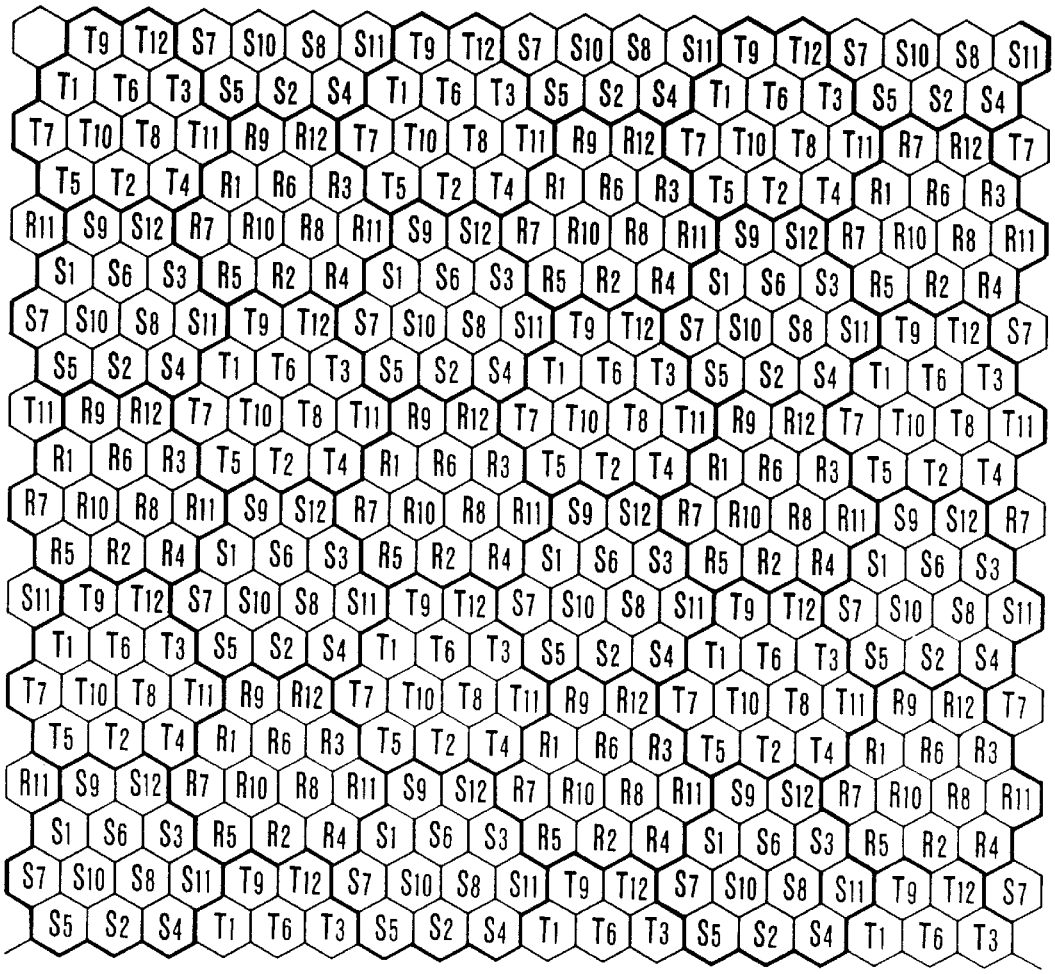
FIG. 15 is a view showing another time division operation of carrier frequencies in the handoff method practiced by the system shown in FIG. 11.
FIG. 16 is a view showing assignment of the time-divisional carrier frequencies (FIG. 15) to cell sites.

FIGS. 15 and 16 are views showing a second example for time division of carrier frequencies and spatial allocation of the frequency-divided carrier frequencies.

Referring to FIGS. 15 and 16, carrier frequencies to be used are given as $f_{11}$, $f_{12}$, $f_{13}$, $f_{21}$, $f_{22}$, $f_{23}$, . . . $f_k l$, (k: an integer satisfying $1 \leqq k \leqq n$; l=1, 2, 3), . . . $f_{n1}$, $f_{n2}$, and $f_{n3}$, and the channels are time-divisionally multiplexed to synchronize with the above carrier frequencies, thereby constituting channel groups $T_1$, $T_2$, . . . $T_{12}$. The same time slots as the channel $T_i$ (i: an integer satisfying $1 \leqq i \leqq 12$) are given as $S_i$ and $R_i$. For example, $S_2$ represents that the carrier frequencies $f_{12}$, $f_{22}$, . . . $f_{k2}$, . . . $f_{n2}$ are time-divisionally multiplexed at the same time slots as in the channel $T_2$.

In this manner, the channels at identical timings constitute channel groups $T_1$ to $T_{12}$, $S_1$ to $S_{12}$, and $R_1$ to $R_{12}$. The channel groups $T_1$ to $T_{12}$, $S_1$ to $S_{12}$, and $R_1$ to $R_{12}$ are assigned to the cell sites, as shown in FIG. 15. In this case, clusters each having a size of 12 are combined to constitute a cluster having a size of 36. Therefore, the number of cell sites at an identical frequency is 36. Similarly, it is possible to increase the number of cell sites at an identical frequency while the degree of multiplexing of channels is kept at 12.

According to this embodiment as described above, a plurality of channels are time-divisionally multiplexed so as to synchronize with the carrier frequencies, the channels at identical timings constitute channel groups, the channel groups are assigned to the cell sites such that the channel group is used as a unit, and the channel groups continuous on the time axis are not used by the adjacent cell sites. With this arrangement, a difference of one or more channels occurs between the present channel and the new channel of the cell site adjacent to the present channel. Therefore, a communication test of the new channel can be performed while communication continues via the present channel. Therefore, an interruption time during the handoff sequence can be eliminated.

According to this embodiment as has been described above, there is provided a handoff method in a cellular digital mobile communication system, wherein transmission timings of the TDMA radio transmitters/receivers are equal to each other within a given base station but are differentiated by one or more time slots between the adjacent base stations, so that an interruption time during the handoff sequence can be substantially eliminated while communication continues.

Figure 17:
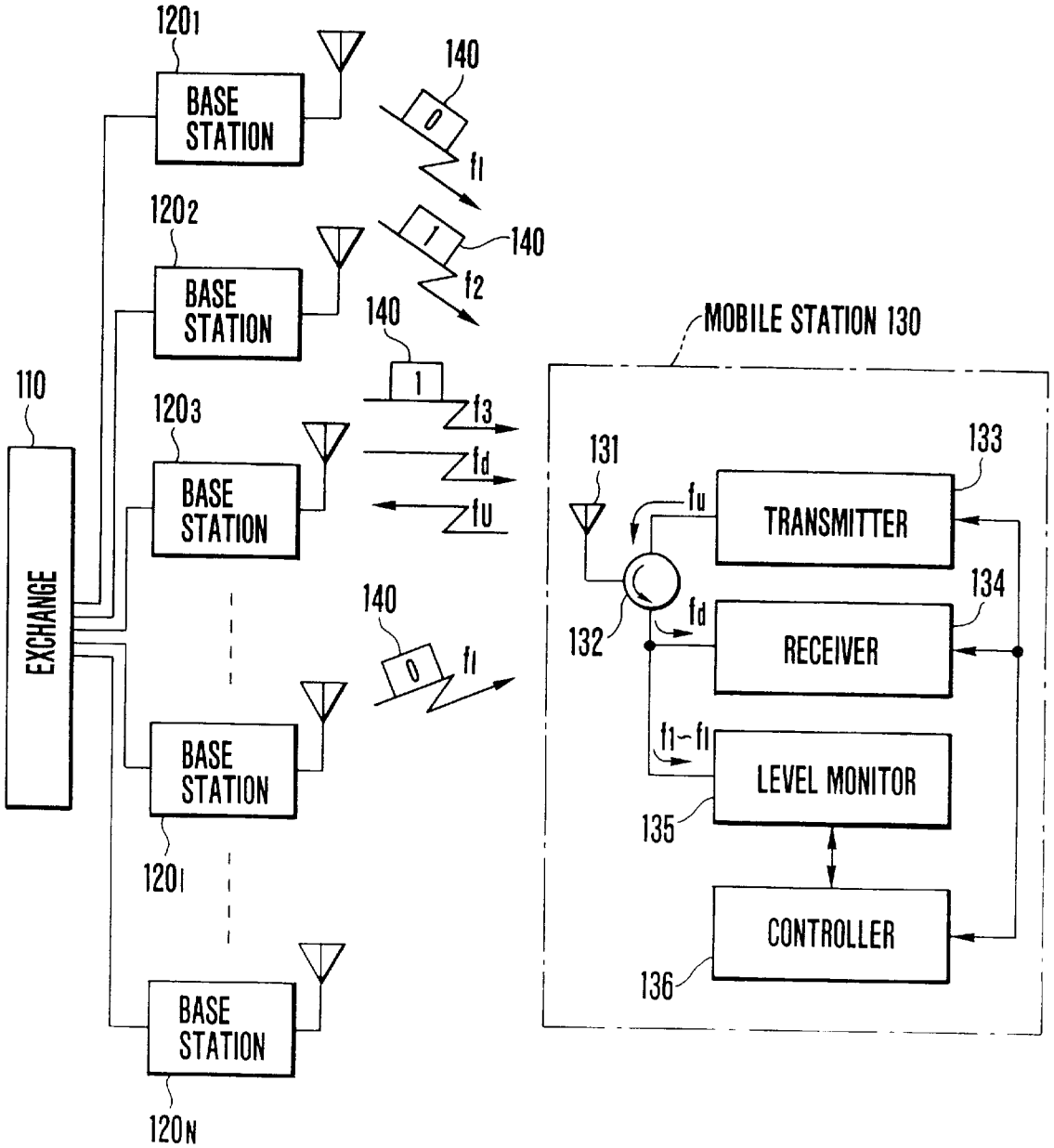
FIG. 17 is a block diagram showing a mobile communication system according to still another embodiment of the present invention.

FIG. 17 is a block diagram showing a cellular mobile communication system for practicing a handoff method according to still another embodiment of the present invention. Referring to FIG. 17, the cellular mobile communication system is constituted by an exchange 110, N base stations $\mathbf{120}_1$, $\mathbf{120}_2$, . . . $\mathbf{120}_N$, and a mobile station 130. The N base stations $\mathbf{120}_1$ to $\mathbf{120}_N$ communicate with the mobile station 130 via communication and control channels uniquely assigned to these base stations. A downward signal of each control channel of the base station includes a flag 140 representing the presence/absence of a free channel of the base station. When the flag 140 is set at level "1", it indicates that a free channel is available. However, when the flag 140 is set at level "0", it indicates that a free channel is not available. Specific frequencies are assigned to the communication and control channels so as not to interfere with each other. Referring to FIG. 17, a frequency $f_d$ is assigned to the downward communication channel of the base station $\mathbf{120}_3$, and a frequency $f_u$ is assigned to the upward channel thereof. In addition, I frequencies are utilized again for the downward control channels. Frequencies $f_1$, $f_2$, $f_3$, and $f_I$ are assigned to the base stations $\mathbf{120}_1$, $\mathbf{120}_2$, and $\mathbf{120}_3$, and $\mathbf{120}_I$, respectively. Other frequency assignment operations are omitted. The mobile station 130 comprises an antenna 131, a hybrid circuit 132, a transmitter 133, a receiver 134, a level monitor 135, and a controller 136. The mobile station 130 communicates with a nearest base station by using the transmitter 133 and the receiver 134. The mobile station 130 receives the signals of the frequencies $f_1$ to $f_I$ via the downward control channels of the base stations by using the level motor 135 upon switching. The mobile station 130 compares reception levels of the base stations having free communication channels and monitors movement between the cell sites based on the flags 140. When a change in cell site is detected, the mobile station 130 transmits a switching request signal representing the base station in the changed cell site to the exchange via the upward communication channel.

Assume that the mobile station 130 connected to the base station $\mathbf{120}_3$ via a downward communication channel of the frequency $f_d$ and an upward communication channel of the frequency $f_u$ is moved from the cell site of the base station $\mathbf{120}_3$ to the cell site of the base station $\mathbf{120}_2$ having a free communication channel. During travel of the mobile station 130, the level monitor 135 has a highest reception level of the frequency $f_2$ in place of the frequency $f_3$. The controller 136 compares the reception levels of the base stations having free communication channels on the basis of the flags 140 and detects a change in cell site to that of the base station $\mathbf{120}_2$ and transmits via the upward communication channel a switching request signal for requesting switching to the base station $\mathbf{120}_2$. When the base station $\mathbf{120}_3$ receives the switching request signal, it signals this to the exchange 110. The exchange 110 selects a free communication channel of the base station $\mathbf{120}_2$ and designates its number to the mobile station 130 via the base station $\mathbf{120}_3$. The mobile station 130 switches the channel to the designated communication channel of the base station $\mathbf{120}_2$. In this manner, the mobile station can always monitor a change in cell site, and control of the handoff sequence is shared by the base and mobile stations, thereby preventing local concentration of a control amount. In this embodiment, different frequencies are assigned to the control channels. However, the control channels may be assigned to an identical frequency by time-divisional multiplexing. In this case, the reception frequency of the level monitor need not be changed.

Figure 18:
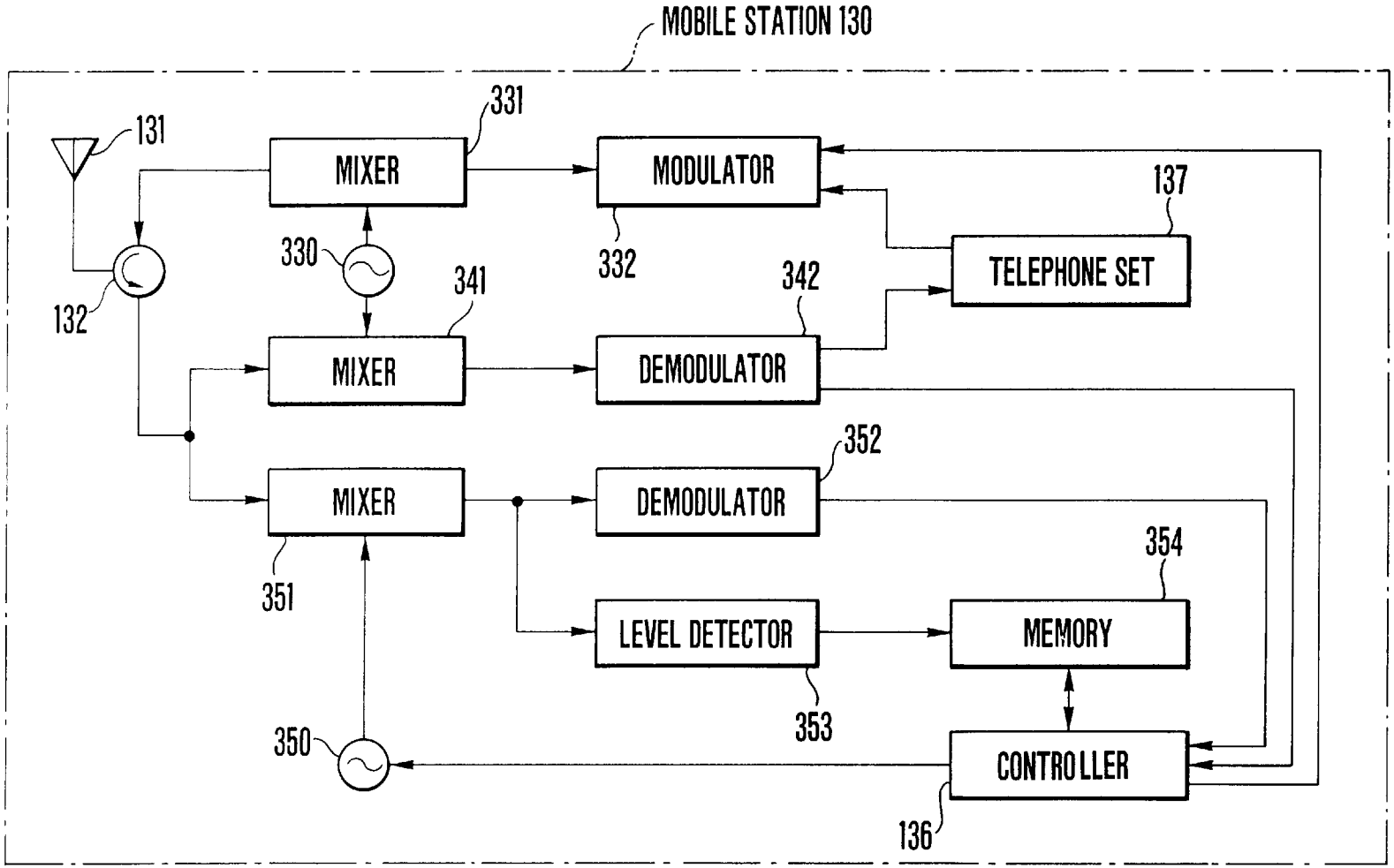
FIG. 18 is a block diagram showing a detailed arrangement of a mobile station shown in FIG. 17.

FIG. 18 is a block diagram of the mobile station 130 shown in FIG. 17. The mobile station 130 comprises an antenna 131, a hybrid circuit 132, a mixer 331, a modulator 332, a mixer 341, a demodulator 342, a mixer 351, a demodulator 352, a level detector 353, an oscillator 350, an oscillator 330, a controller 136, and a telephone set 137. In this case, the mixer 331 and the modulator 332 constitute the transmitter 133. The mixer 341 and the demodulator 342 constitute the receiver 134. The mixer 351, the demodulator 352, the level detector 353, and the oscillator 350 constitute the level monitor 135. The oscillator 330 is used to control the mixers 331 and 342. An RF signal received by the antenna 131 is input to the mixers 341 and 351 through the hybrid circuit 132. The RF signal of the downward communication channel is mixed with an output from the oscillator 330 by the mixer 341 and is converted into an IF signal. The IF signal is demodulated by the demodulator 342. The demodulated signal is supplied to the telephone set 137. A control signal included in the communication channel is sent to the controller 136. A speech signal output from the telephone set 137 and a control signal output from the controller 136 are converted into an IF signal by the modulator 332. An output from the modulator 332 is mixed with an output from the oscillator 330 by the mixer 331. An output from the mixer 331 is transmitted as an RF signal from the antenna 131 via the hybrid circuit 132. Any modulation/demodulation techniques may be utilized, and a detailed description thereof will be omitted. One frequency may be assigned to one communication channel, or one frequency may be assigned to a plurality of communication channels by time division multiplexing.

An RF channel of the downward control channel is mixed with an output from the oscillator 350 by the mixer 351, and the output from the mixer 351 is supplied to the demodulator 352 and the level detector 353. The output from the mixer 351 is demodulated by the demodulator 352 and is supplied to the controller 136 as a control signal including a base station identification code, and a flag representing the presence/absence of a free communication channel. At the same time, the level of the output from the mixer 351 is detected by the level detector 353. A level detection signal is supplied to a memory 354. The controller 136 sequentially changes the oscillation frequencies of the oscillator 350 so as to sequentially receive signals via the downward control channel of each base station. When the controller 136 detects the base station identification code in the output from the demodulator 352, the controller 136 causes the memory 354 to store the corresponding output from the level detector 353 and the flag representing the presence/absence of the free communication channel in units of base station identification codes. The controller 136 compares the reception levels of the base stations having free communication channels, which are stored in the memory 354. The control circuit 136 thus monitors a change in cell site. When a change in sell site is detected, the controller 136 transmits a switching request signal including the designation base station identification code. If a plurality of reception levels of the respective base stations are stored and their mean values are compared, the influence of detection errors caused by fading is minimized. In this case, a plurality of flags representing the presence/absence of free communication channels are stored. Comparisons can be performed by using the latest flags. In this manner, when a change in cell site is monitored by the mobile station, concentration of control amounts during the handoff sequence can be prevented.

When the base station monitors a change in cell site upon comparison between the reception levels of the upward signals of the mobile station, this monitoring must be performed by a plurality of base stations and monitoring results must be concentrated. Therefore, when channel switching is frequently performed, the control amount is locally concentrated.

According to the present invention, however, each mobile station can compare the reception levels of the downward signals of the base stations to monitor a change in cell site, so that monitoring control can be shared by the base and mobile stations. For this purpose, the level monitor is arranged in the mobile station to receive the downward signals from other base stations excluding a given station while the mobile station communicates with the given station. The downward signal may be received by the level monitor via a communication channel, but preferably via a control channel which normally transmits the downward channel. When the control channel is time-divisionally multiplexed by each base station throughout the cell sites, the reception frequency of the monitor need not be changed to simplify the apparatus arrangement. The base station transmits a downward signal including the flag representing the presence/absence of a free communication channel, and the mobile station compares the reception levels of the downward signals of the base stations having free communication channels. Therefore, a base station having no free communication channel cannot be selected as a designation station. In this manner, the mobile station monitors a change in cell site during communication. When the change in cell site is detected, the mobile station transmits a switching request signal and is switched to the designation base station having a free communication channel. Therefore, local concentration of the control amount during the handoff sequence can be prevented.

According to this embodiment as has been described above, there is provided a handoff method and a mobile station in a cellular digital mobile communication system substantially free from a local increase in control amount caused by an increase in the frequency of occurrence of channel switching.

What is claimed is:

1. A mobile station comprising:

communicating means for performing communication using a time-divisionally multiplexed communication channel;

switching means for switching a present channel to a new channel during the free time of the time-divisionally multiplexed communication channel; and a communication test circuit for performing a communication test of the new channel when said switching means is connected to the new communication channel.

2. A hand off method for a cellular digital mobile communication system comprising the steps of:

providing a time-divisionally multiplexed communication channel;

changing a frequency to that of a new communication channel at a time at which communications at time slots of the time-divisionally multiplexed communication channel are completed; and switching the new communication channel back to the time-divisionally multiplexed communication channel when one of a communication test of the new communication channel is completed and a predetermined period of time has elapsed, thereby performing the communication test of the new communication channel.

3. A mobile station comprising:

communication means for performing communication using a time-divisionally multiplexed communication channel;

switching means for switching a frequency or the time-divisionally multiplexed communication channel into a frequency of a second time-divisionally multiplexed communication channel at a time at which communications at time slots of the time-divisionally multiplexed communication channel are completed and for switching from said second time-divisionally multiplexed communication channel to the time-divisionally multiplexed communication channel when one of a communication test of said second time-divisionally multiplexed communication channel is completed and a predetermined period of time has elapsed; and a communication test circuit for performing the communication test of said second time-divisionally multiplexed communication channel while said switching means switches the frequency of the time-divisionally multiplexed communication channel to that of said second time-divisionally multiplexed communication channel.

4. A handoff method for a cellular digital mobile communication system, said method comprising:

providing a plurality of base stations and mobile stations, wherein each base station comprises at least one time-divisional multiplex access radio transmitter/receiver, transmission/reception timings of the time-divisional multiplex access radio transmitter/receiver are identical within a given base station but are differentiated in adjacent base stations by one or more time slots, and performing a communication test by a mobile station with a base station adjacent to a specific base station during the free time between time slots in the communication channel of said specific base station, while said mobile station is still maintaining communication with said specific base station.

*5. A mobile assisted handoff method for use in a digital cellular system, comprising the steps of:*

*a) receiving at a mobile station a communication signal transmitted from a first base station in a first time slot of a first frequency;*

*b) transmitting from said mobile station to said first base station a communication signal in a second time slot of a second frequency, said second time slot being different in time from said first time slot;*

*c) detecting at said mobile station a signal transmitted from a second base station in a third time slot of a third frequency, said third time slot being different in time from said first and second time slots; and*

*d) responsive to the result of said detecting step (c), determining whether said mobile station enters a cell site other than the cell site of said first base station.*

*6. A method for use in a digital cellular system including a plurality of mobile stations and a plurality of base stations, comprising the steps of:*

*a) receiving at a first one of said plurality of mobile stations a communication signal transmitted from a first one of said plurality of base stations in a first time slot of a first time-divisionally multiplexed frequency;*

*b) transmitting from said first mobile station to said first base station a communication signal in a second time slot of a second time-divisionally multiplexed frequency, said second time slot being different in time from said first time slot;*

*c) detecting at said first mobile station a signal transmitted from a second one of said plurality of base stations in a third time slot of a third time-divisionally multiplexed frequency, said third time slot being different in time from said first and second time slots; and*

*d) responsive to the result of said detecting step (c), determining whether handoff of said mobile station is needed.*

*7. A method as claimed in claim 6, wherein said detecting step (c) comprises the steps of:*

*c1) detecting at said first mobile station the levels of signals transmitted from a plurality of base stations including said second base station;*

*c2) calculating the mean values of the signal levels detected at step (cl);*

*c3) producing said mean values calculated at step (c2) as the result of said detecting step (c).*

*8. A mobile assisted handoff method for use in a digital cellular system, comprising the steps of:*

*a) receiving at a mobile station a communication signal transmitted from a first base station in a first time slot of a first frequency;*

*b) transmitting from said mobile station to said first base station a communication signal in a second time slot of a second frequency, said second time slot being different in time from said first time slot;*

*c) detecting at said mobile station a signal transmitted from a second base station in a third time slot of a third frequency, said third time slot being different in time from said first and second time slots; and*

*d) responsive to the result of said detecting step (c), determining whether handoff of said mobile station is needed.*

*9. A mobile station comprising:*

*means for receiving a communication signal transmitted from a first base station in a first time slot of a first frequency;*

*means for transmitting to said first base station a communication signal in a second time slot of a second frequency, said second time slot being different in time from said first time slot; and*

*means for detecting a signal transmitted from a second base station in a third time slot of a third frequency, said third time slot being different in time from said first and second time slots.*

*10. A handoff method for a cellular digital mobile communication system comprising the steps of:*

*providing a time-divisionally multiplexed communication channel;*

*changing a frequency to that of a new communication channel at a time at which communications at time slots of the time-divisionally multiplexed communication channel are completed; and*

*switching the new communication channel back to the time-divisionally multiplexed communication channel when one of a crossover test is completed and a predetermined period of time has elapsed, thereby performing the crossover test during the change to the new communication channel.*

*11. A mobile station comprising:*

*communicating means for performing communication using a time-divisionally multiplexed communication channel;*

*switching means for switching a present channel to a new channel during the free time of the time-divisionally multiplexed communication channel; and*

*a crossover test circuit for performing a crossover test by receiving a transmission on said new channel when said switching means is connected to the new communication channel.*

*12. A handoff method for a cellular digital mobile communication system, said method comprising:*

*providing a plurality of base stations and mobile stations, wherein each base station comprises at least one time-divisional multiplex access radio transmitter/receiver, transmission/reception timings of the time-divisional multiplex access radio transmitter/receiver are identical within a given base station but are differentiated in adjacent base stations by one or more time slots, and*

*performing a crossover test by a mobile station with a base station adjacent to a specific base station during the free time between time slots in the communication channel of said specific base station, while said mobile station is still maintaining communication with said specific base station.*

*13. A mobile station comprising:*

*communication means for performing communication using a time-divisionally multiplexed communication channel;*

*switching means for switching a frequency of the time-divisionally multiplexed communication channel into a frequency of a second time-divisionally multiplexed communication channel at a time at which communications at time slots of the time-divisionally multiplexed communication channel are completed and for switching from said second time-divisionally multiplexed communication channel to the time-divisionally multiplexed communication channel when one of a crossover test at said second time-divisionally multiplexed communication channel is completed and a predetermined period of time has elapsed; and*

*a crossover test circuit for performing the crossover test while said switching means switches the frequency of the time-divisionally multiplexed communication channel to that of said second time-divisionally multiplexed communication channel.*

* * * * *